United States Patent [19]
Cho et al.

[11] Patent Number: 5,725,778
[45] Date of Patent: Mar. 10, 1998

[54] CURRENT DRIVER FOR ELECTRONIC DESCALING

[75] Inventors: Young I. Cho, Cherry Hill, N.J.; Joseph M. Evans, III, Morgantown, Pa.

[73] Assignees: Electronic Descaling 2000, Inc., Boothwyn; Drexel University, Philadelphia, both of Pa.

[21] Appl. No.: 544,156

[22] Filed: Oct. 17, 1995

[51] Int. Cl.$^6$ ...................................... C02F 1/48
[52] U.S. Cl. .......................... 210/695; 210/748; 210/222; 422/22
[58] Field of Search ................... 210/222, 748, 210/695; 422/22

[56] References Cited

U.S. PATENT DOCUMENTS

| | | | |
|---|---|---|---|
| 1,978,509 | 10/1934 | Roberts | 210/695 |
| 2,596,743 | 5/1952 | Vermeiren | 210/1.5 |
| 2,652,925 | 9/1953 | Vermeiren | 210/1.5 |
| 2,939,830 | 6/1960 | Green et al. | 210/695 |
| 3,228,878 | 1/1966 | Moody . | |
| 3,693,792 | 9/1972 | Lang | 209/212 |
| 3,843,507 | 10/1974 | Kwan | 204/302 |
| 4,326,954 | 4/1982 | Shroyer | 210/222 |
| 4,407,719 | 10/1983 | Van Gorp | 210/695 |
| 4,659,479 | 4/1987 | Stickler et al. | 210/695 |
| 4,865,747 | 9/1989 | Larson | 210/695 |
| 4,865,748 | 9/1989 | Morse | 210/739 |
| 4,879,045 | 11/1989 | Eggerichs | 210/695 |
| 4,892,655 | 1/1990 | Makovec | 210/222 |
| 5,074,998 | 12/1991 | De Baat Doelman | 210/97 |
| 5,171,431 | 12/1992 | Schulte | 210/94 |
| 5,200,071 | 4/1993 | Spiegel | 210/222 |
| 5,238,577 | 8/1993 | Newsom | 210/695 |
| 5,269,915 | 12/1993 | Clair | 210/222 |

FOREIGN PATENT DOCUMENTS

| | | | |
|---|---|---|---|
| 0610142 | of 0000 | European Pat. Off. | C02F 1/48 |
| 2250221 | of 0000 | United Kingdom | C02F 1/48 |

OTHER PUBLICATIONS

"MagneGen" advertizing materials (Address: P.O. Box 94321, Las Vegas NV 89199)—11 sheets.

Maggard, S. M., A Chemometric Analysis of a Magnetic Water Treatment Device, Doctoral Dissertation publiched by UMI, Ann Arbor, MI. (1989). Abstract and pp. 177–192.

Kronenberg, K. J., Magnetic Water Trement De–mystified, Magnets 6–15, 27 (Aug. 1987).

Turnbull, D., The Kinetics of Precipitation of Barium sulfate from Aqueous Solution, ACTA Metallurgica, vol. 1, 684–691 (1953).

(List continued on next page.)

*Primary Examiner*—Neil McCarthy
*Attorney, Agent, or Firm*—Robert S. Lipton, Esq.; Lipton & Husick

[57] ABSTRACT

An electronic descaling system to prevent or remove mineral deposits by exposing moving fluids to magnetic and electric fields includes an improved power supply. In particular, the power supply adapts to the varying length, diameter and impedance of attached coil and cable combinations, and still provides the proper current and power levels to effectuate electronic descaling. A constant current D.C. power supply having a regulated D.C. current output level is provided. The substantially constant D.C. current output is then switched in a switching circuit responsive to a switching control signal to provide a bi-directional current through the coil in one direction and then switched to conduct current through the coil in the other direction. The switching frequency of the switching control signal is time variable or constant. The present improved current driver adapts for such varying frequencies while providing a substantially constant D.C. current output level as the frequency of switching control signal varies. The descaling coil provides the proper induced electric and magnetic fields, and the resulting induced electromotive force, for different switching frequencies and for cables with varying lengths and coils with varying diameters.

8 Claims, 5 Drawing Sheets

OTHER PUBLICATIONS

Turnbull, D., Kinetics of Heterogeneous Nucleation, The Journal of Chemical Physics, vol. 18, No. 2, 198–203 (1950).

Turnbull, D. et al., Rate of Nucleation in Condensed Systems, The Journal of Chemical Physics, vol. 17, No. 1, 71–73 (1949).

Herzog, R. E. et al., Magnetic Water Treatment: The Effect of Iron on Calcium Nucleation and Growth, Langmuir, 5, 861–867 (1989).

Enomoto, N. et al., Effect of Ultrasonic Irradiation on Hydration of MgO Powder, 713–717 (1993).

Sultanov, Sh. Sh. et al., Effect of sound ans Magnetic Fields on Sitall Formation in Lithium Aluminosilicate Glasses Synthesized in Radiant Heating Furnaces, Fizika i Khimiya Stekla, vol. 19, No. 1 161–168 (191).

Hu et al., A Review of the Literature: Magnetic Water Treatment in Heat Transfer Applications, Johns Hopkins University Technical Report No. HMT-9101, 1–46.

Scaletek International, Sales Literature for Water Quality Management Systems, 8 pages (1994).

The MONO-TEC Group, Inc., Magnetizers and Valence Electrons Bulletin 032492, 20 pages, Sales Literature.

CURRENT DRIVER FOR ELECTRONIC DESCALING

FIELD OF THE INVENTION

This invention relates to an improvement in the field of electronic descaling wherein fluids are treated by exposure to magnetic and electric fields.

BACKGROUND OF THE INVENTION

Approximately 85% of the fresh water in the United States can be designated as hard water. Hard water contains calcium and other dissolved minerals, such as magnesium, which can and do accumulate on the surfaces of the container that are in contact with the water. This accumulation leads to hardened scale deposits which clog pipes and encrust heat transfer surfaces. The hardened scale deposits also cause damage to appliances attached to the water supply.

The origin of most scale accumulation is the transformation of a supersaturated solution of hard water to the corresponding saturated solution. Supersaturated mineral ions (such as calcium) will combine with counter-ions (such as bicarbonate ions) precipitate, and deposit on the surfaces of the container. In such a supersaturated solution, scale accumulation becomes unavoidable, unless preventive measures are taken.

Scale build-up costs Americans billions of dollars each year, due to equipment failure or replacement costs. For example, heat loss typically accounts for 10% of the fuel cost of a newly installed residential or small commercial heater. At the end of its first year of operation, the cost due to heat loss typically increases to 15%; after five years, the cost due to heat loss mounts to 70% of the overall cost of fuel. Scale and lime deposits are responsible for this increase. To remove these scales, many companies resort to water or sand blasting, acid cleaning, and/or scraping. These procedures are costly and require significant downtime. In short, scale deposits have long afflicted industrial giants dependent on water-cooled heat transfer, and the individual homeowner alike.

Many have attempted to alleviate this problem through exposing hard water to magnetic fields. Others have used an energized solenoid cable wrapped around a pipe for the purpose of treating fluids within the pipe with electrical and magnetic fields. For example, see U.S. Pat. Nos. 5,074,998, 5,171,431, 4,326,954, 2,596,743 and 3,843,507. However these prior inventions, at best, have had only sporadic success. Attempts to apply these earlier systems as a general solution to the problem of scale deposition has resulted in unexplainable failure, for which there appeared to be no remedy.

DEFINITIONS

The description of the present invention is facilitated by the use of the following term which is used in this patent specification and the claims as defined herein:

A "fluid container" is a vessel that holds either running and/or standing fluids. Some examples of fluid containers are pipes, tanks, condensers, evaporators, boilers, cooling towers, chillers, and heat exchangers.

SUMMARY OF THE INVENTION

Electronic descaling procedures prevent and/or remove mineral deposits by exposing the moving fluid to magnetic and electric fields. The effectiveness of electronic descaling procedures depends in part on the proper strength and modulation of the magnetic and electric fields within the pipe. Many types of power sources have been provided to supply and modulate the power to the solenoid coil wrapped around the pipe. The inventors have discovered the cause of the heretofore unexplainable failure of all prior systems to serve as a general solution to the problem of scale deposition, and herein describe the remedy. The inventors have found that the descaling process will proceed properly, so long as the current and power in a given coil is controlled at an appropriate and substantially constant level, regardless of the length of the cable connecting the coil.

In addition to the modulation of power to the coil, the level of power provided from the power supply must be matched to the desired coil size. For example, a given installation with a coil wrapped around a pipe positioned close to the power supply, represents a smaller impedance than the same coil positioned far from the power supply, due to the added impedance of the cables and connections. In a case like this, the more distant coil will draw less current from the same constant voltage power supply than the closer coil.

Furthermore, a coil wrapped around a large diameter pipe produces a large impedance due to the large self-induction. Therefore, employing the same constant voltage power supply to a circuit comprising a coil wrapped around a large diameter pipe will result in an output current that is significantly lower than a comparable circuit comprising the same coil wrapped around a small diameter pipe. Accordingly, the power supply of the present invention is adjustable to set the level of output current in accordance with the diameter of the pipe.

Also, with time, the impedance values of connections and materials change due to age factors. Thus when a voltage regulated power supply is used, as is the general case for embodiments in the prior art, the current flowing in the coil falls below the optimal value originally designed for the circuit.

Changing from one installation to another, creates a need to provide different power supplies for accommodating cables of different connecting lengths and coils of different diameters. While the power supply could be manually adjustable, and include instructions as to how to select the proper power level for a given coil length, diameter, and turn number, there would be no adaptability for aging or change in location of the descaling unit, without manual readjustment. Also, in the case of a manually adjustable power supply, if the user erroneously selected too low a power level, the electric and magnetic fields would be too weak, and effective electronic descaling would not occur.

The present invention provides an improved power supply for electronic descaling in which the power supply automatically adapts to the varying length and impedance of attached cables and connections, and still provides the proper current and power levels in the coil to effectuate electronic descaling. In particular, this invention provides a constant current D.C. power supply having a regulated D.C. current output level. The substantially constant D.C. current output is then switched in a switching circuit responsive to a switching control signal to provide a bi-directional current through the coil. That is, the switching circuit conducts current through the coil in one direction for one half the time and then switches to conduct current through the coil in the other direction for one half the time (in the case of a symmetrical switching control signal). The primary power source is a regulated D.C. current power supply.

The switching frequency of the switching control signal may either be constant, adjustable, or made to vary with time such as with a triangular sweep frequency wave. The present improved current driver also adapts for such varying frequencies while providing a substantially constant D.C. current output level even when the frequency of the switching control signal is varied.

Since the maximum D.C. current output level is from a regulated constant current D.C. supply, the maximum D.C. current is substantially constant for both short cables and long cables, for both small and large diameter coils, as well as for both static and variable frequencies. As a result, the descaling coil provides the proper induced electric and magnetic fields, and the resulting induced electromotive force, when used with diverse combinations of cables and switching frequencies.

Finally, the power supply of the present invention is adjustable to provide different levels of constant current output according to different expected coil diameters. The constant current output level is set by adjustment at or before installation. In such manner, one power supply may be used with a wide range of coils and cables.

DETAILED DESCRIPTION

Figure 1:
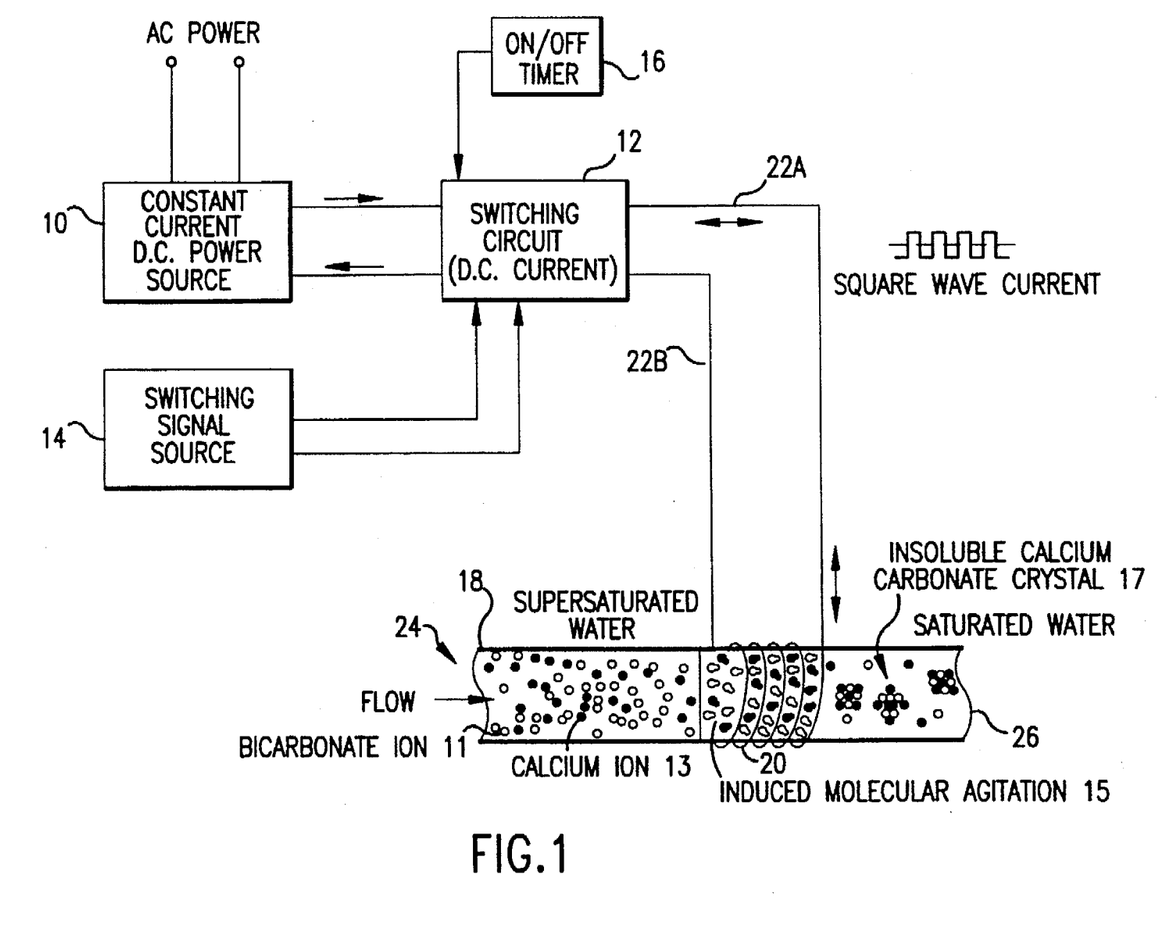
FIG. 1 is a block diagram of an improved current driver for an electronic descaling apparatus embodying the present invention.

An electronic descaling system in accordance with the present invention is shown in FIG. 1. A descaling coil or solenoid 20 is positioned around a pipe 18. The power to the coil 20 is supplied by a constant current source 10, a switching circuit 12 and a signal switching source 14. In addition, an on/off timer circuit 16 cycles the supply of power to the coil 20 describing system.

In operation, AC power is applied to constant current D.C. power source 10, which provides a substantially constant level of D.C. current output to the switching circuit 12. The switching circuit 12, responsive to control signals from the switching signal source 14, provides output D.C. current in a first direction through the coil 20, or output D.C. current in a second, opposite direction through coil 20.

The constant current switched D.C. power in conductors 22A and 22B, induces switched magnetic and electric fields generated by coil 20 within the fluids flowing inside the pipe 18 to effectuate descaling of dissolved mineral ions. For example, the induced molecular agitation in the region 15 causes the input flow 24 of supersaturated water containing bicarbonate ions 11 and calcium ions 13 to be converted to an output flow 26 of saturated water containing insoluble calcium carbonate crystals 17.

Figure 2:
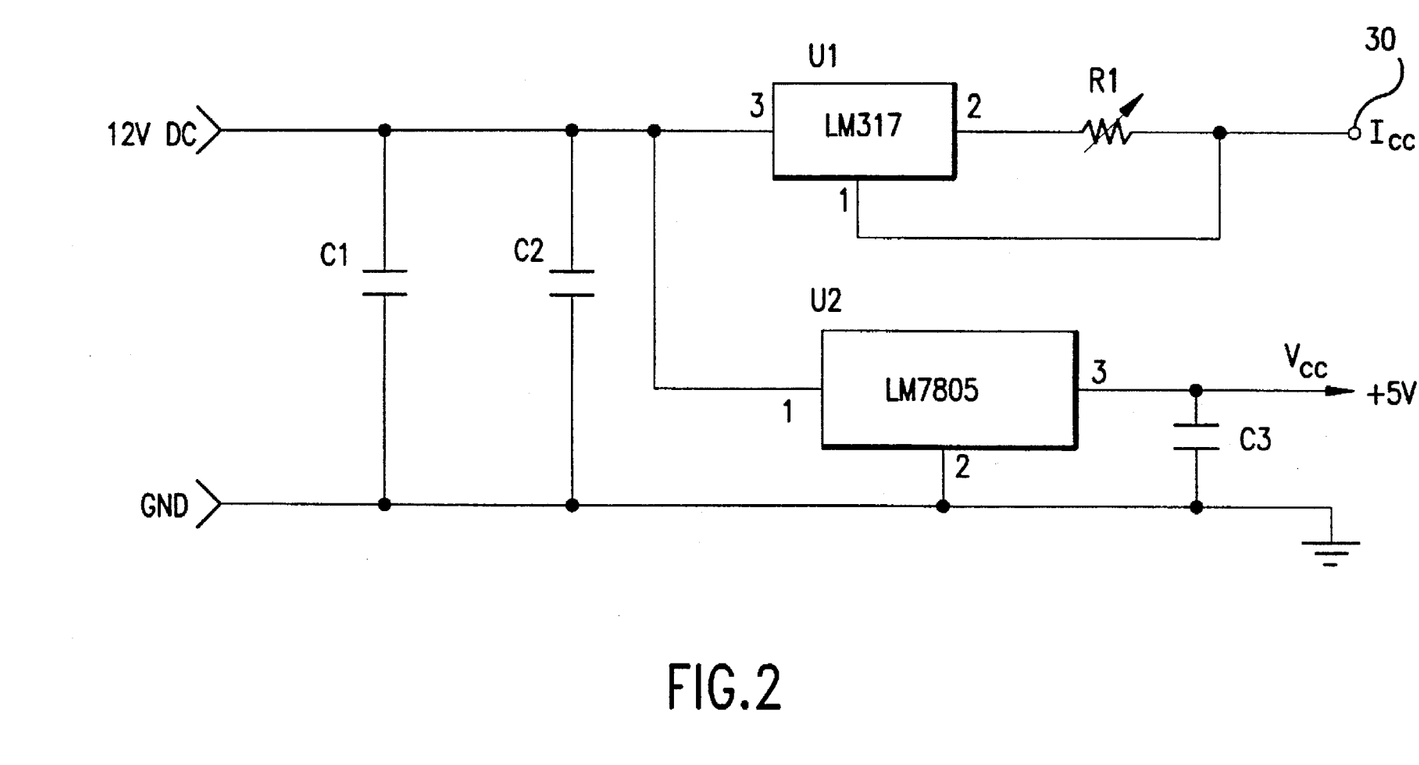
FIG. 2 is a schematic diagram of the constant current D.C. power source 10 of FIG. 1, in accordance with the present invention.

A circuit for providing a constant D.C. current output, at an output current node 30, and 5 volts (Vcc) is shown in FIG. 2. The circuit consists of capacitors C1, C2 and C3, resistor R1, current regulator U1 and voltage regulator U2. Input D.C. power at 12 VDC is provided by a wall mount AC/DC adapter. In operation, C1 provides low frequency ripple filtering while C2 provides higher frequency noise filtering. U1 is a three terminal adjustable regulator, which along with adjustable resistor R1 forms a constant current source. Resistor R1 senses current and provides a control voltage input to control terminal i of U1. The output current, I, is determined by the adjustment of the value of R1, the output current, I, being equal to 1.25/R1. A 5 volt D.C. output (Vcc) is generated for the other logic circuitry by the 5 volt D.C. regulator, U2. Capacitor C3 provides the output bypass filtering.

Figure 3:
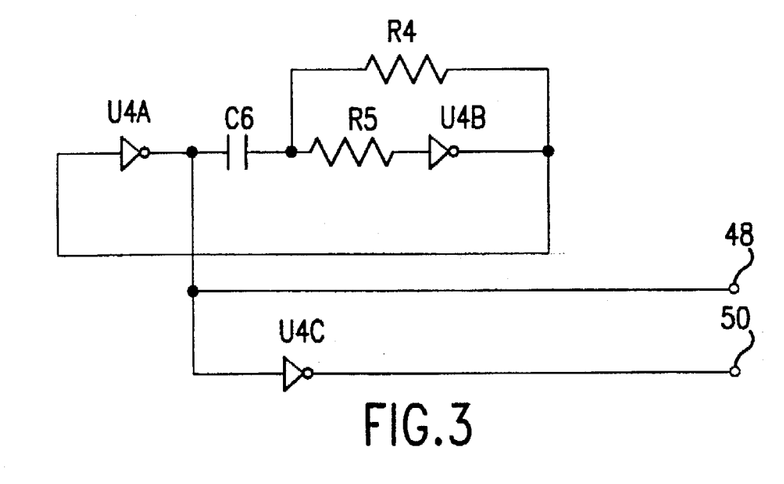
FIG. 3 is a circuit diagram, partially in block form, of a switching signal source 14 of FIG. 1, in accordance with the present invention.
Figure 4:
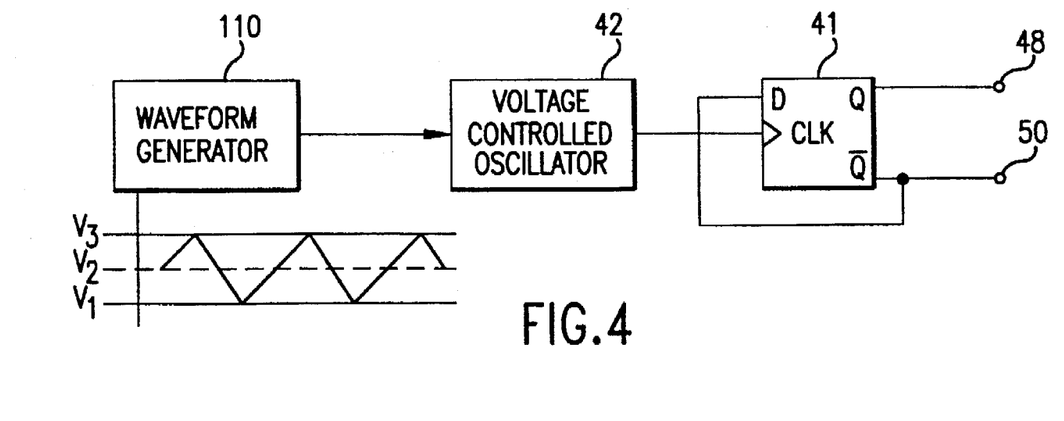
FIG. 4 is a circuit diagram, partially in block form, of an alternate embodiment of a switching signal source 14 of FIG. 1, in accordance with the present invention.

As indicated from FIG. 1, the current from a constant current D.C. is switched in a switching circuit responsive to a switching signal source. FIGS. 3 and 4 represent alternate embodiments of a switching signal source. In FIG. 3, the switching signal frequency is constant, while in FIG. 4, the switching frequency is variable.

In FIG. 3, inverters U4A and U4B are connected in an oscillator feedback arrangement with resistors R4, R5 and capacitor C6. The time period of oscillation is a function of the values of the capacitor and the resistors. The selection of resistor R4 provides a means of adjustment of the period of oscillation, which is set to be 500 Hz. A 500 Hz square wave output is provided at node 48 at the output of inverter U4A. The logical complement of the output at node 48 is provided at node 50 at the output of inverter U4C.

An alternate switching signal source which provides a sweep frequency square wave as the switching signal source to nodes 48 and 50, is shown in FIG. 4. A waveform generator 40 provides a triangular wave between 1 and 3 volts to a voltage controlled oscillator 42. The output of VCO 42 is a periodic waveform which linearly sweeps back and forth between 1 KHz and 3 KHz which is output to the clock input of flip flop 41. Flip flop 41 divides the 1–3 KHz input to provide a 0.5 to 1.5 KHz output at the Q output thereof to node 48 and the complement of that signal at the Q NOT output to node 50.

Figure 5:
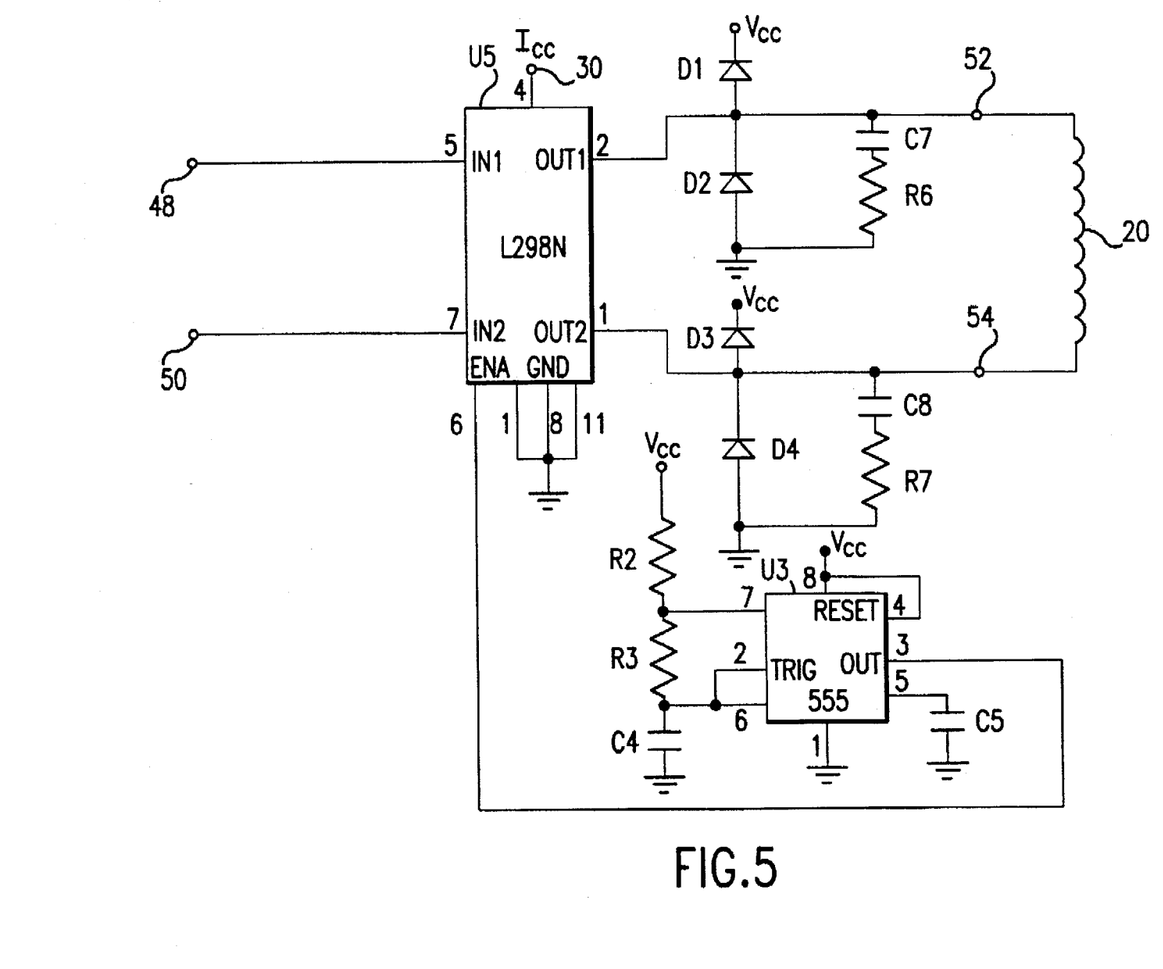
FIG. 5 is a schematic diagram of a switching circuit 12 and a schematic diagram of an off off timer 16 of FIG. 1, in accordance with the present invention.

The constant current D.C. output at node 30 and the switching signal source at nodes 48 and 50 are used in the switching circuit of FIG. 5 to drive coil 20. In particular, a full wave rectifier in the form of a power bridge circuit U5, provides two input controls, IN1 and IN2. When the input to IN1 is at a first logic level and the input to IN2 is at the opposite logic level, Icc at terminal 30 is connected to conduct current to output terminal OUT1, while at the same time output terminal OUT2 is connected to conduct current from output terminal OUT2 to ground. When the input to IN1 is at a second logic level and the input to IN2 is at the opposite logic level, i.e. the first logic level, Icc at terminal 30 is connected to conduct current to output terminal OUT2, while at the same time output terminal OUT1 is connected to conduct current from output terminal OUT1 to ground.

One terminal of coil 20 is coupled to terminal 52 and to OUT1 of U5, while the other terminal of coil 20 is coupled to terminal 54 and to OUT2 of U5. Diodes D1, D2, D3 and D4 are current steering diodes which keep nodes 52 and 54 respectively, clamped between Vcc and ground, when the current coil 20 is being switched. That is, if the voltage at terminal 52 attempts to go above Vcc, diode D1 conducts to keep terminal 52 clamped at Vcc. If the voltage at terminal 52 attempts to go below ground level, diode D2 conducts to keep terminal 52 clamped at ground level. Similarly, if the voltage at terminal 54 attempts to go above Vcc, diode D3 conducts to keep terminal 54 clamped at Vcc. If the voltage at terminal 54 attempts to go below ground level, diode D4 conducts to keep terminal 54 clamped at ground level. In addition, a high pass filter consisting of a series connected capacitor, C7 and resistor R6 ground provide noise suppression at terminal 52. A similar high pass filter consisting of a series connected capacitor, C8 and resistor R7 also provide similar noise suppression at terminal 54.

In operation, the constant current D.C. input at node 30 is switched in alternating directions through coil 20. First, when the control signal at node 48 is at a first logic level and the control signal at node 50 is at a second logic level, Icc at terminal 30 is connected to conduct current to output terminal OUT1, providing a current flow in coil 20 from terminal 52 to terminal 54 and through terminal OUT2 of U5 to ground. Then, when the control signal at node 50 is at a first logic level and the control signal at node 48 is at a second logic level, Icc at terminal 30 is connected to conduct current to output terminal OUT2, providing a current flow in coil 20 from terminal 54 to terminal 52 and through terminal OUT1 of U5 to ground. As the control signals at nodes 48 and 50 reverse polarity, the current in coil 20 is switched from one direction to the opposite direction.

In addition, an on/off timer circuit is provided to the enable ENA input of U5 to cycle the D.C. output current to coil 20 on and off. A typical cycle time is 5 minutes on and 5 minutes off. The on/off timer circuit consists of resistors R2, R3, capacitors C4, C4 and a 555 integrated circuit timer chip U3. Resistors R2, R3 and capacitor C4 are chosen to provide a cyclical on/off timer period of 5 minutes on and 5 minutes off. The output time period and duty cycle is given by:

T(total time period)=0.693 (R2+2R3) C4

D(duty cycle)=R3/R2+2R3)

In operation, the output of timer chip U3 at the ENA enable input of U5 provides switched D.C. constant current to coil 20 for 5 minutes. After 5 minutes of descaling operation, the output of timer chip U3 at the ENA enable input of U5 shuts off the switched D.C. constant current to coil 20 for 5 minutes. Thus, for 5 minutes coil 20 has no current flow, and thereafter, the process of 5 minutes on and 5 minutes off repeats.

| Specifications | |
|---|---|
| Input voltage | 12 volts DC +/−10% |
| Input current | 200 mA source |
| Oscillator: | |
| Nominal frequency | 500 Hz |
| Frequency range | 400 Hz–600 Hz |
| Function | Square wave |
| Timing enable: | |
| Nominal range | 5 minutes on/5 minutes off |
| Range | 3–10 minute intervals |
| Output drive | |
| Load | Maximum 1 ohm impedance |
| Constant current | 70 mA |

| Active component designations | | |
|---|---|---|
| U1 | LM317 | National Semiconductor LM317AT |
| U2 | LM7805 | Panasonic AN7805 |
| U3 | LM555 | National Semiconductor LM555CN |
| U4 | HC4049 | National Semiconductor MM74HC4049N |
| U5 | L298 | SGS-Thomson L298N |

Figure 6:
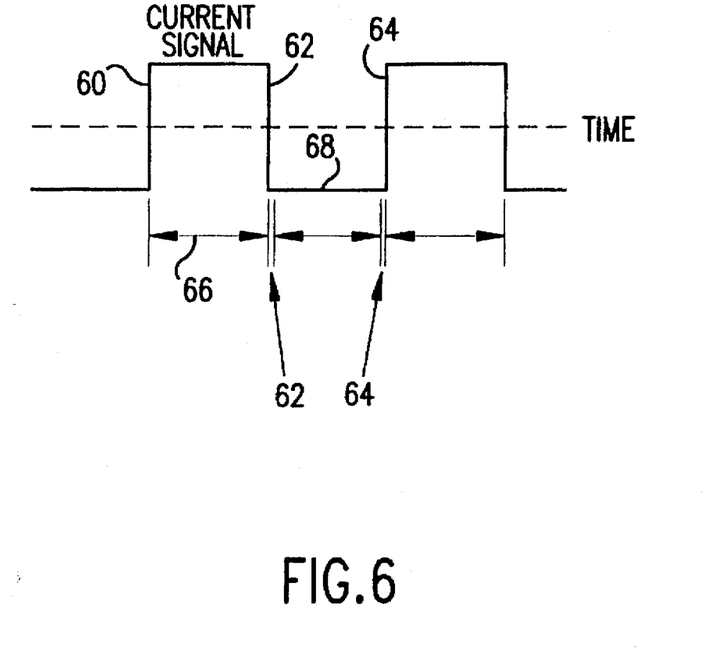
FIG. 6 is a waveform of the current in the descaling coil, in accordance with the present invention.

FIG. 6 shows the current waveform, a switched D.C. current waveform 60 provided to coil 20. As indicated in FIG. 6, while the coil current is in steady state (not changing), there is a constant D.C. current provided through the coil. That is, during the steady state current 66 in one direction, or steady state current 68 in the opposite direction, the constant current D.C. supply determines the current level. In the steady state, the magnetic field of the coil is constant. However, during the transition 62 between D.C. current in first direction to the second direction the coil provides a changing magnetic field for inducing electromotive forces in the fluid within the pipe. Similarly, during the transition 64 between D.C. current in the second direction, to D.C. current in the first direction a changing magnetic field is generated.

Although bi-directional current switching is shown, uni-directional current switching may also be used. In the latter case, a constant D.C. current would Be switched on in one direction for half the time, and switched off with no coil current flowing in the opposite direction for half the time.

Figure 7:
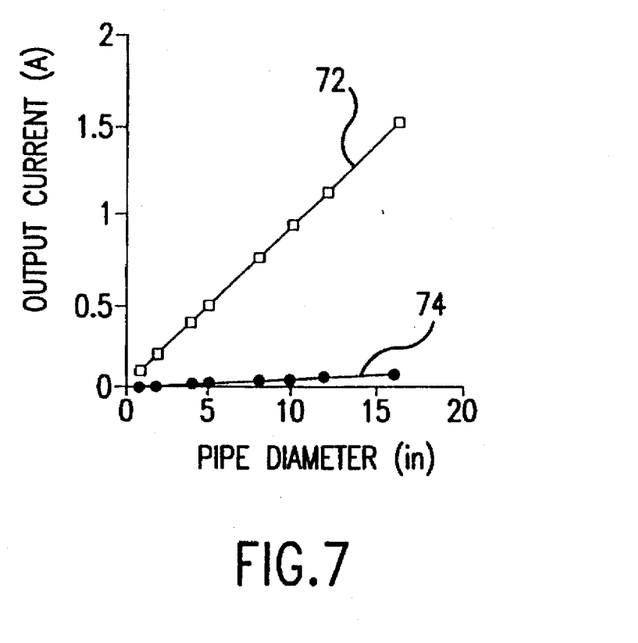
FIG. 7 is a graphical representation of the output of the constant current source to the descaling coil, for pipes of different diameters, as used in conjunction with the present invention.

A graph showing the preferred design choice for the constant current power supply versus pipes of various diameters is shown in FIG. 7. A first set of design data points 72, shows preferred settings of the constant current power supply output when used with the preferred bi-directional or uni-directional current switching. A second set of design data points 74, shows the actual current output through a coil having twenty-two turns, when a voltage controlled oscillator (VCO) is used for current switching.

It is noted that due to the use of a constant current source in the power supply of the present invention, the D.C. current levels in FIG. 6 will be independent of the total impedance of the coil 20 and cables attached to the switched D.C. current driver. As a result, the proper treatment will occur regardless of the installation arrangement, the power supply adapting to the increased impedance of longer cables or larger coil diameters and the decreased impedance of shorter cables or smaller diameter coils.

What is claimed is:

1. A method for treating a fluid in a pipe to effect electronic descaling, said method comprising:

providing a coil having first and second terminals, said coil being disposed to provide a field through said fluid;

generating a D.C. current;

applying said D.C. current through electric connections so as to pass through said coil in a first direction from said first terminal to said second terminal;

interrupting said D.C. current to turn off said D.C. current in said coil; and automatically regulating said D.C. current ahead of said electric connections so as to maintain said D.C. current at a substantially constant intensity.

2. A method in accordance with claim 1 further including:

switching said regulated D.C. current to pass through said coil in a reverse direction from said second terminal to said first terminal to provide a reverse D.C. current; and interrupting said reverse D.C. current to turn off said reverse D.C. current in said coil.

3. A method in accordance with claim 1 wherein said step of interrupting said regulated D.C. current from passing through said coil in said first direction from said first terminal to said second terminal further includes the step of varying the frequency of said interrupting.

4. A method in accordance with claim 1, wherein said step of interrupting said regulated D.C. current from passing through said coil in a first direction from said first terminal to said second terminal further includes the step of maintaining the frequency of said interrupting substantially constant.

5. A method according to claim 1, wherein said coil and said electric connections collectively present an electrical impedance within a predetermined range; and said automatic regulating maintains said D.C. current at said substantially constant intensity over said predetermined range.

6. A method according to claim 5 wherein the predetermined range of said impedance is determined by parameters which include the dimensions of said coil, the dimensions of said electric connections, and the age of said coil and said connections.

7. A method according to claim 1, wherein the interrupting is of substantially the same time duration as the applying of said D.C. current.

8. A method according to claim 2, wherein the time durations of said applied and switched D.C. currents are substantially the same.

* * * * *